Feb. 15, 1966 M. M. OWEN 3,234,794
GOLF DRIVE INDICATOR
Filed Nov. 8, 1962
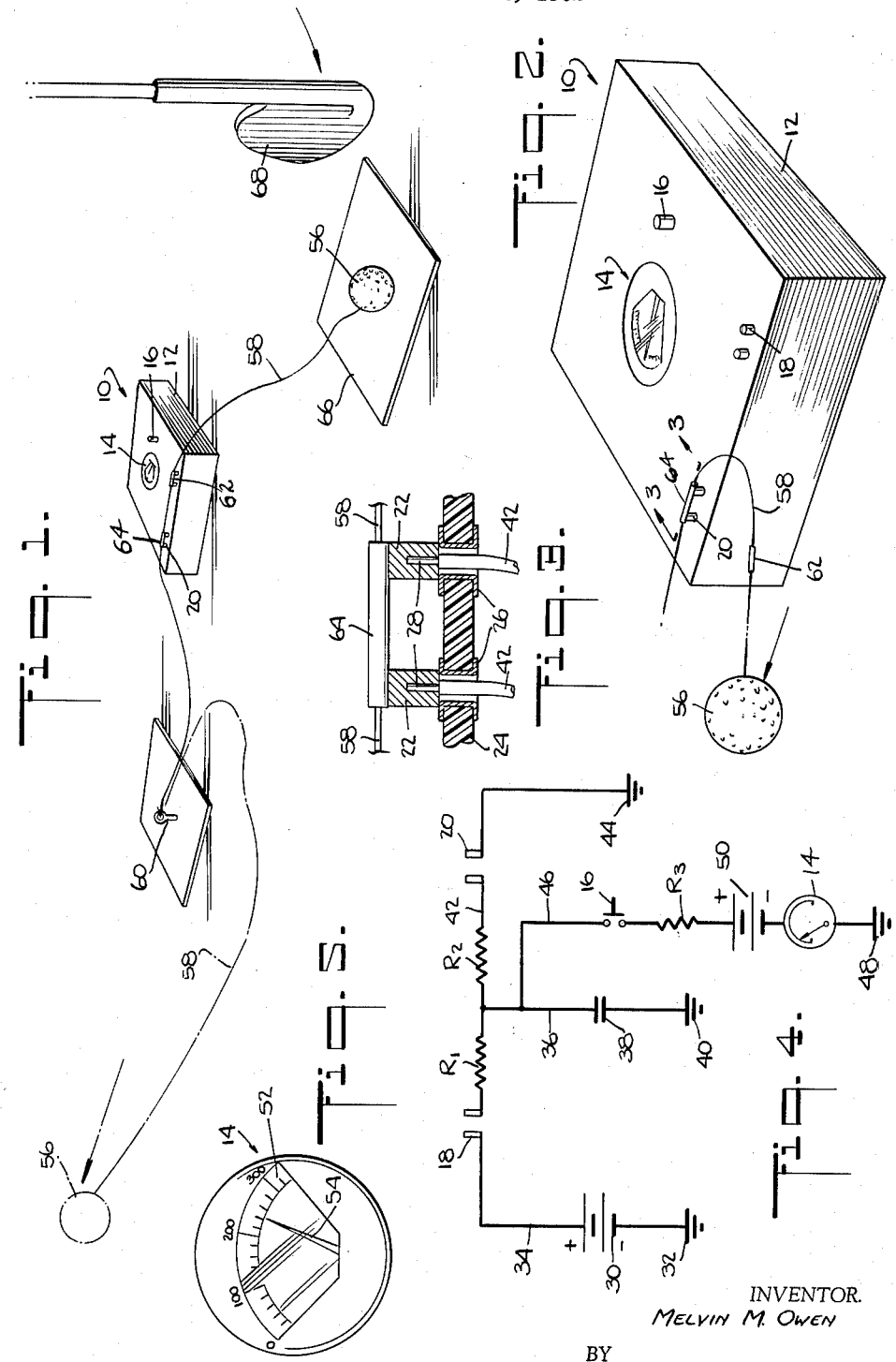
INVENTOR.
MELVIN M. OWEN
BY
S.B. Schlessel
ATTORNEY

# United States Patent Office 3,234,794
Patented Feb. 15, 1966

3,234,794
GOLF DRIVE INDICATOR
Melvin M. Owen, 465 Ocean Ave., Brooklyn, N.Y.
Filed Nov. 8, 1962, Ser. No. 236,302
4 Claims. (Cl. 73—379)

This invention relates generally to games and game apparati, and has for its specific objective the provision of an electronic golf drive measuring device, in combination with a tethered golf ball, by which the distance the driven ball would travel, if free, is accurately measured.

As is well known, skill and proficiency in the game of golf is acquired and improved with practice. One of the most important elements of the game, and requiring a great deal of practice, is the development of the golfer's driving ability so as to acquire greater distance in his drive to the green. Ordinarily, in order to practice his drive the golfer would have to travel to a driving range or find some large unobstructed area with a range of at least 300–350 yards. In either case a considerable amount of time and effort is wasted retrieving driven balls, and in travel. Many golfers are therefore presently retricted in their opportunities to practice.

The principal object of my invention, therefore, is to provide a golf drive indicating device which can be used in limited space areas, such as a backyard, or even a room, and which can provide the user with the same facilities as a driving range for practicing his drive and measuring the distance the ball would travel thereby.

Another important object of my invention is the provision of a golf drive indicator which is simple to operate and inexpensive to manufacture.

A third important object of my invention is the provision of a golf drive indicator which is small and compact, and which can conveniently be stored on a shelf or in a drawer when not in use.

Still another important object of my invention is the provision of a golf drive indicator which is sturdy and long-lasting.

Other salient objects, advantages and functional features will become more readily apparent from an examination of the following specifications, taken with the accompanyings; wherein:

FIG. 1 is a perspective view of a preferred embodiment of my invention, set up for operation;

FIG. 2 is an enlarged perspective view of the housing for my indicator;

FIG. 3 is an enlarged cross-sectional view, taken on lines 3—3 of FIG. 2;

FIG. 4 is a diagrammatic view of the electric circuits employed; and

FIG. 5 is an enlarged top view of the microammeter dial on the housing.

Similar reference characters designate similar parts throughout the different views.

Illustrative of the embodiment shown, my golf drive indicator 10 comprises a housing 12, of plastic or similar insulating or non-conducting material, approximately 1½' x 1' x 6" in size, provided with a microammeter 14, of standard construction and design, which is activated by means of a spring button switch 16. Along one side of the housing 21 there are provided two spaced magnetic switches 18 and 20, which are connected, as is the microammeter 14, to electrical circuits within the housing 12, as will hereinafter be shown. Each of the switches 18 and 20 consists of a pair of aligned cylindrical conductive magnets 22, acting as terminals, secured to and through the roof 24 of the housing by grommets 26. The magnets 22 have imbedded therein terminals 28 of lead wires of the electrical circuits within the housing 12.

Referring now to FIG. 4, current is provided by a 6 volt battery 30 having its negative terminal grounded as at 32 and its positive terminal connected by leads 34 and 36 to a capacitor 38 by means of the switch 18, the capacitor 38 being grounded as at 40. A 6 ohm resistor R1 is provided in lead 34 so that when the switches 18 and 20 are closed a charge of 5 volts is transferred from the battery 30 to the capacitor 38. A secondary circuit is provided by the lead 42, grounded as at 44, provided with a resistor R2 of 30 ohms and connected to lead 36 and the capacitor 38 by means of the switch 20. A third circuit is provided by lead 46 which is connected, by means of the button switch 16, to the microammeter 14 which is grounded as at 48. A resistor R3 of 20 kilohms and a bucking battery 50 (battery having its positive terminal opposing the positive current flow in lead 46) of 1.5 volts are disposed betwen the switch 16 and the micro-ammeter 14 to reduce the current flow from the capacitor 38 so that the current may be read in microamperes on the microammeter 14 which is provided with a scale 52 and an indicator needle 54.

In FIG. 5 there is shown a top view of the microammeter 14, in which the scale 52 is calibrated in terms of distance or yardage instead of microamperes, the amount of current in the capacitor 38 at a given time being measured in terms of distance instead of charge, as will hereinafter be explained.

In combination with the indicator 10, as is shown in FIG. 1, there is provided a golf ball 56 secured to a cord 58, preferably of nylon, which is tethered or secured at its other end to a fixed peg 60. A pair of steel tubes or sleeves 62 and 64 are secured to the cord 58, the sleeve 62 being spaced from the ball 56 a distance to permit easy access to the ball 56 for driving purposes when the sleeve 62 is magnetically attached to the terminals of the switch 18, and the sleeve 64 being spaced from the sleeve 62 in the opposite direction on the cord 58 a preselected distance which is at least greater than the distance between the switches 18 and 20, so that there is slack in the cord 58 between the sleeves 62 and 64 when the latter are magnetically secured to the respective switches 18 and 20. A platform 66, or other suitable tee, is provided to support the ball 56 in position to be addressed by the golf club 68.

In the operation of my invention, the cord 58 is magnetically attached to the switches 18 and 20 by the engagement of the respective sleeves 62 and 64 with the terminals of said switches, sleeve 62 to switch 18 and sleeve 64 to switch 20. The ball 56 is placed upon its platform 66 in a position so that the flight of the ball 56, when struck with the club 58, will be in a direction substantially parallel to the plane of alignment of the switches 18 and 20, the sleeves 62 and 64 acting as shorting jacks so that when the ball 56 is struck the sleeve 62 will first leave the switch 18 and the sleeve 64 will thereafter leave the switch 20, the time lapse between the two actions depending upon the force with which the ball is struck and the angle of its flight, the continuation of the flight of the ball 56 being restricted, following detachment of the sleeves 62 and 64 from the respective switches 18 and 20, to the immediate area by the attachment of the cord 58 at its other end to the peg 60.

Referring now to both FIGS. 2 and 4, when the sleeves 62 and 64 are attached to the respective switches 18 and 20, the respective circuits are closed and the electrical charge flows from the 6 volt battery 30 through the 6 ohm resistor R1 into the capacitor 38, the charge in the capacitor 38 becoming 5 volts (30/36×6). When the ball 56 is struck, sleeve 62 is first pulled off switch 18, breaking the first circuit, and the capacitor 38 starts to discharge through discharging resistor R2 and sleeve 64 into the ground, as at 44, through the lead 42. The discharge ceases when sleeve 64 is pulled off switch 20 by the continued flight of the ball 56, breaking the second circuit. The charge remaining in the capacitor 38 is then measured through the microammeter 14 by closing the button switch 16. The amount of current passing through the microammeter 14 is reduced by the resistor R3 of 20 kilohms and the bucking battery 50, as shown, so that the charge in the capacitor 38 may be measured within a range of from 0 to a maximum of 50 microamperes, depending on the time lapse between the breaking of the two circuits, a matter of a fraction of a second. This time lapse, instead of being measured in microamperes however, is measured on the scale 52 in terms of yardage or distance. As is well known in the art, the microammeter needle 54 will swing to the right on the dial 52 to register the maximum charge remaining in the capacitor 38, and then slowly return as the charge diminishes. Although the needle 54 will stay at the maximum only a fraction of a second, this will be sufficient time to take a reading. Knowing the predetermined distance that the ball 56 travels between the breaking of the first and of the second circuit, and the time lapse between such breaks, the initial velocity of the ball 56 and the range of travel is determined by the application of the appropriate mathematical formulae for velocity and for range. Actual test drives with an unrestricted golf ball serves to calibrate the microammeter scale 52 initially in terms of exact yardage.

Coming now to the actual use of my invention, the player attaches sleeve 62 to switch 18 and sleeve 64 to switch 20. He then places the ball 56 upon the platform 66 and strikes the ball 56 with his club 68, swinging in a direction parallel to the plane of the respective switches 18 and 20. The velocity of the drive pulls off the sleeves 62 and 64 in order, breaking the first circuit to discharge the capacitor 38 and then the second circuit to stop the discharge. The ball is stopped from further flight by the engagement of the cord 58 with the peg 60. The player then closes button switch 16 and reads on the scale 52 of the microammeter 14 the yardage the ball would have traveled if unrestricted. He is then ready to repeat the performance with further drives in the same manner, able to gauge the extent or range of each of his drives, and to seek to improve his range by adjustment of his stance, swing, etc.

As is apparent, various changes may be made in the construction, composition and arrangement of parts, all within the scope of my invention. With a reduced capacitance either a resistor or bucking battery alone may be sufficient for opposition. The positioning of the switches 18 and 20, the battery and the capacitor, with respect to one another, may likewise be varied within the limits of achieving the requisite closing and breaking of the circuits involved.

As is also apparent, while my invention is adapted for the measurement of the range of a golf ball drive, it may also be employed in similar manner for the measurement of range of other types of projectiles, and also for time lapse measurement for diverse purposes, as indicated.

The embodiment thus shown and described, therefore, is by way of illustration, and various changes may be made in construction, composition and arrangement of parts without limitation upon or departure from the spirit and scope of the invention, or sacrificing any of the advantages thereof inherent therein, all of which are claimed.

Having described my invention, I claim:

1. A golf drive apparatus comprising in combination a golf ball provided with a tethering cord adapted to secure the ball to a fixed base, the cord being provided with a pair of spaced steel sleeves, and an indicator comprising an insulating housing, a first circuit comprising a direct current electric supply as a source of current, a capacitor, current conducting means, a switch adapted to connect the current supply to the capacitor, and an intermediate resistor, a second circuit comprising grounded current conducting means, a switch adapted to connect the capacitor with said current conducting means, and resistor means in the circuit intermediate the capacitor and the switch, a third circuit comprising a microammeter, current conducting means connecting the microammeter to the capacitor, a button switch adapted to close the circuit, and means to reduce the current flow from the capacitor to the microammeter, all of the switches and the microammeter dial exposed through the housing, the first two switches being spaced apart and provided with magnetic means upon their terminals adapted to attract and hold the steel sleeves of the ball cord to close their respective circuits.

2. A golf drive apparatus as claimed in claim 1, the microammeter dial being calibrated in terms of distance instead of microamperes.

3. A golf drive apparatus as claimed in claim 2, the means to reduce the current flow from the capacitor to the microammeter comprising a resistor and a direct current electric supply disposed to flow in a direction opposing the current flow from the capacitor.

4. A golf drive apparatus as claimed in claim 2, the means to reduce the current flow from the capacitor to the microammeter comprising a resistor.

References Cited by the Examiner
UNITED STATES PATENTS

| | | | |
|---|---|---|---|
| 1,672,395 | 6/1928 | Shinn et al. | 273—200 |
| 2,795,273 | 6/1957 | Putnam | 324—70 |
| 2,825,569 | 3/1958 | Alvarez | 73—379 |
| 2,933,681 | 4/1960 | Crain | 73—379 X |
| 3,051,491 | 8/1962 | Cabot | 273—200 |

RICHARD C. QUEISSER, *Primary Examiner.*

JOSEPH P. STRIZAK, *Examiner.*